(12) United States Patent
Bointon et al.

(10) Patent No.: US 7,740,117 B2
(45) Date of Patent: Jun. 22, 2010

(54) NEUTRAL SECTION INSULATOR

(75) Inventors: Richard Bointon, Yealmpton (GB); Peter R. Shrubsall, Ottery St. Mary (GB)

(73) Assignee: Multiclip Company Limited, Addlestone (GB)

( * ) Notice: Subject to any disclaimer, the term of this patent is extended or adjusted under 35 U.S.C. 154(b) by 0 days.

(21) Appl. No.: 12/470,124

(22) Filed: May 21, 2009

(65) Prior Publication Data

US 2009/0223766 A1   Sep. 10, 2009

Related U.S. Application Data

(63) Continuation of application No. 10/553,297, filed as application No. PCT/GB2004/002251 on May 27, 2004, now Pat. No. 7,552,807.

(30) Foreign Application Priority Data

Jun. 4, 2003 (GB) .................. 0312831.1
Mar. 10, 2004 (GB) .................. 0405412.8

(51) Int. Cl.
   *B60M 1/00* (2006.01)
(52) U.S. Cl. ..................... 191/39; 174/137 R
(58) Field of Classification Search ............ 191/39, 191/22 R, 38, 43, 33 R; 439/884, 886; 174/137 R, 174/176, 181, 138 D
See application file for complete search history.

(56) References Cited

U.S. PATENT DOCUMENTS

| 560,097 | A | 5/1896 | Keithley |
| 1,868,619 | A | 7/1932 | Watson |
| 1,940,873 | A | 12/1933 | McCafferty |
| 3,952,848 | A | 4/1976 | Walker et al. |
| 4,018,315 | A | 4/1977 | Proud |
| 4,406,930 | A | 9/1983 | Menhorn et al. |
| 4,424,889 | A | 1/1984 | Hockele et al. |
| 5,310,047 | A | 5/1994 | Ledingham |

FOREIGN PATENT DOCUMENTS

DE   B 1057164   5/1959

(Continued)

OTHER PUBLICATIONS

International Search Report dated Sep. 23, 2004, Application PCT/GB2004/002251.

(Continued)

*Primary Examiner*—Mark T Le
(74) *Attorney, Agent, or Firm*—Marshall, Gerstein & Borun LLP

(57) ABSTRACT

In a neutral section (1) for use with an overhead railway conductor line, which neutral section (1) is disposed between the ends of the conductor line when in use and comprises an insulator (10) to isolate the ends of the conductor line from each other, the neutral axis of the neutral section (1) being such that when the neutral section (1) is in use the neutral axis is aligned closely with the neutral axis of the conductors on its either side and the height of the insulator (10) is chosen so that the stiffness and the dynamic mass of the neutral section (1) closely match those of the conductors on its either side in both the vertical and horizontal planes.

22 Claims, 8 Drawing Sheets

FOREIGN PATENT DOCUMENTS

| | | |
|---|---|---|
| DE | 2741547 | 3/1979 |
| GB | 802046 | 9/1958 |
| GB | 1326071 | 8/1973 |
| GB | 1378751 | 12/1974 |
| GB | 1505083 | 3/1978 |
| JP | 56-4637 | 1/1983 |

OTHER PUBLICATIONS

United Kingdom Search Report dated Jul. 19, 2004. Application GB0405412.8.

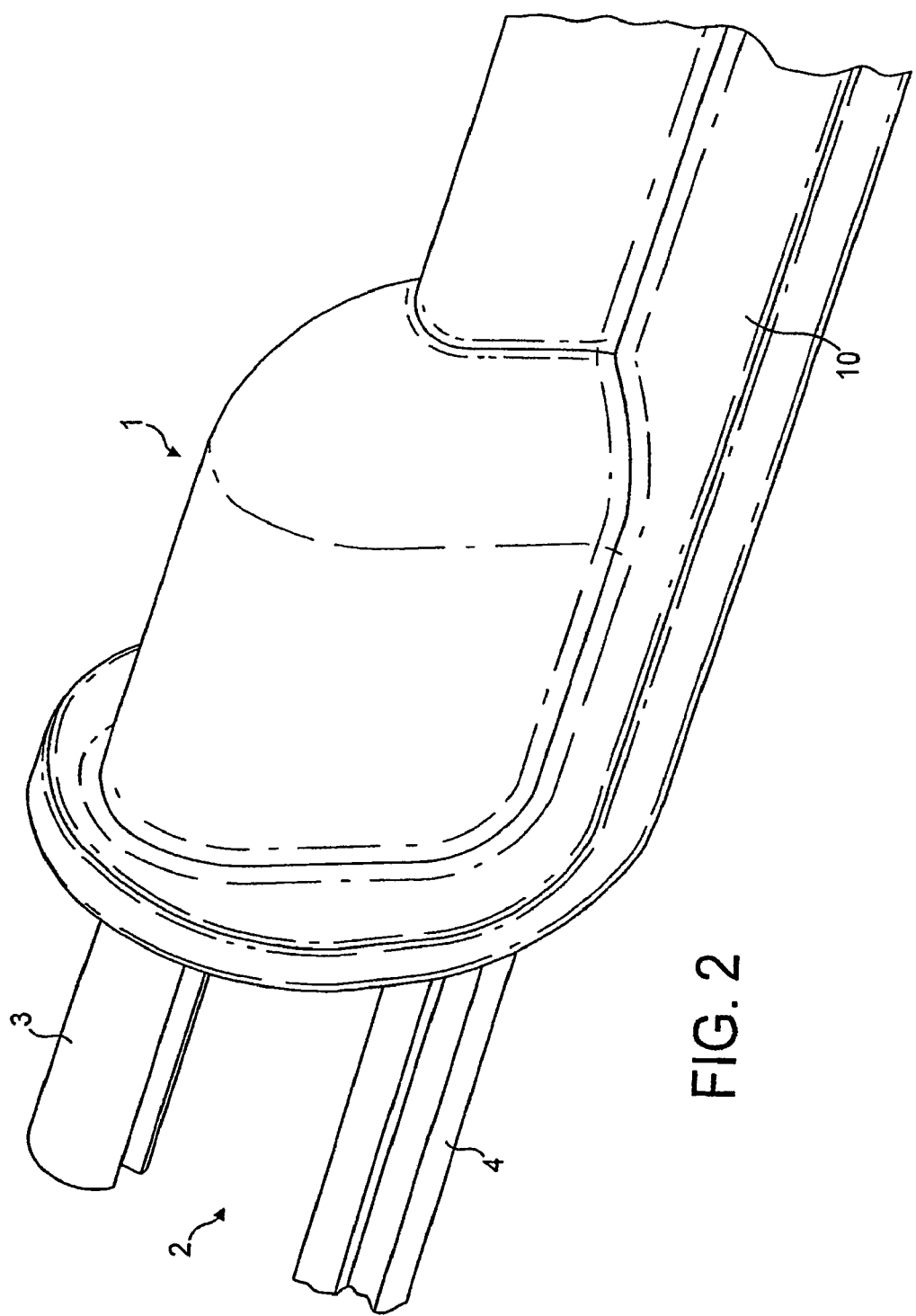

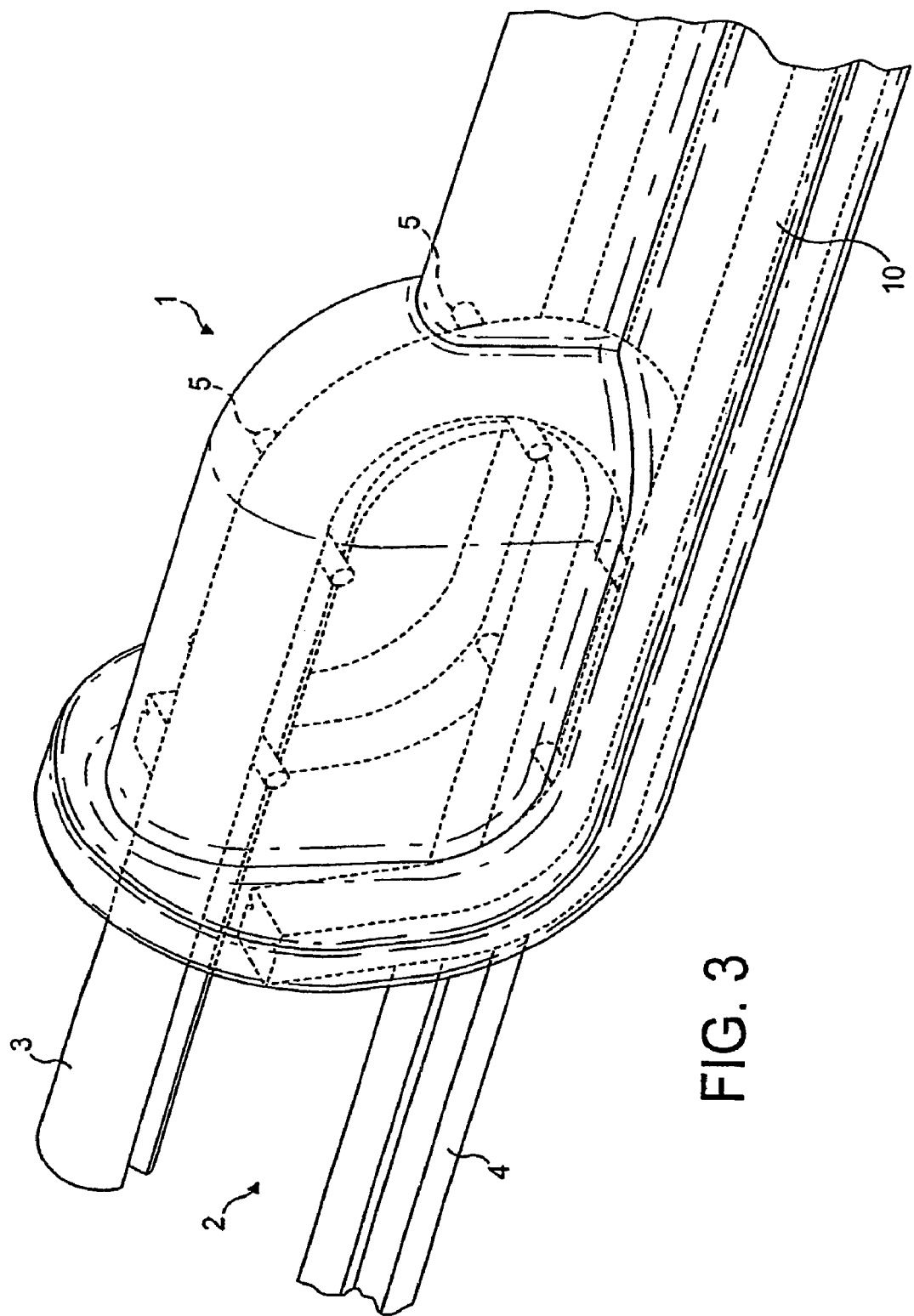

SECTION A-A

SECTION B-B

SECTION C-C

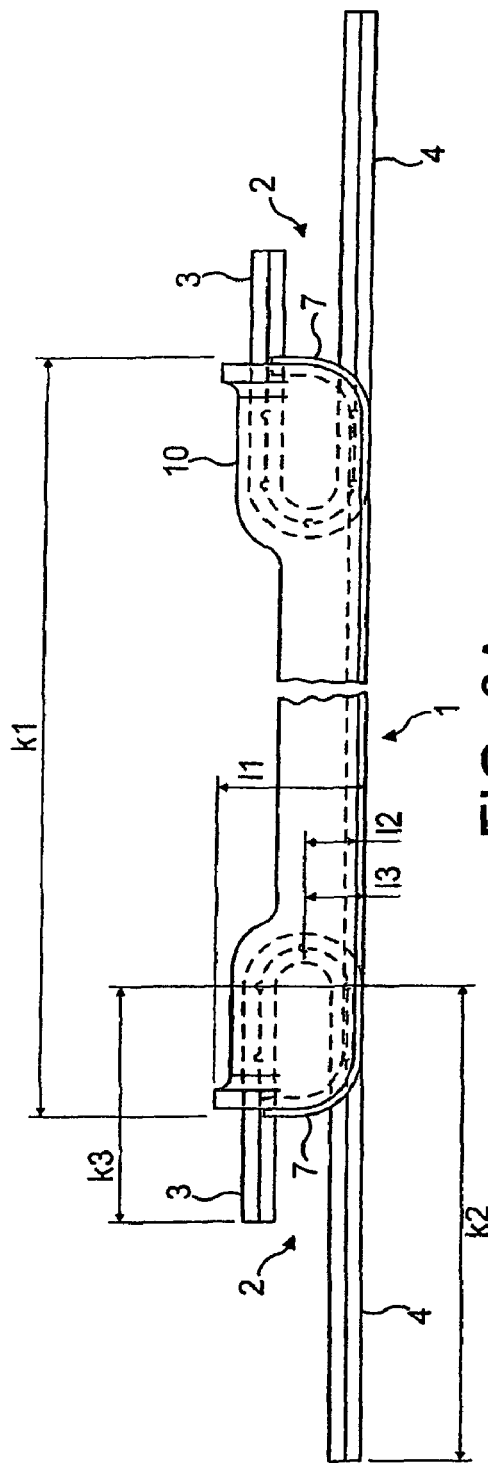

NEUTRAL SECTION INSULATOR

REFERENCE TO RELATED APPLICATIONS

This application is a continuation of U.S. patent application Ser. No. 10/553,297, (now U.S. Pat. No. 7,552,807) filed Oct. 14, 2005, which application is a U. S. National Phase under 35 U. S. C. §371 of International Application No. PCT/GB2004/002251, having an international filing date of May 27, 2004, and claims priority of United Kingdom Application No. UK0312831.1, filed Jun. 4, 2003, and UK0405412.8, filed Mar. 10, 2004.

FIELD OF THE DISCLOSURE

The present invention relates to a neutral section insulator for use in conjunction with railway overhead conductor lines.

BACKGROUND

Electric trains are powered through overhead copper conductor lines, the power being conveyed via a pantograph attached to the roof of the train. The conductor lines are usually powered by 25 kV AC supplied from power stations along the route of the lines. As the power stations are not synchronized, a peak-to-peak difference of up to 50 kV AC can occur where two power supplies meet along the length of a conductor line. It is important to ensure that the pantograph does not register the difference in power supplies as otherwise a large electrical load would be placed on it, which could damage it and other electrical equipment in the train. As it is impractical to synchronize the power stations, they are normally isolated from each other by the provision of an assembly known as a neutral section insulator on each conductor line.

It is desirable that the pantograph does not detect the presence of the neutral section insulator on the conductor lines as, apart from electrical loading, it would then also be subject to variable reaction forces, which would be conveyed to the train to cause "humping".

The neutral section insulators that are currently on the market include those provided by Siemens GmbH, Arthur Flury AG and Furrer & Frey AG. The neutral section insulator of Siemens GmbH, consisting of two insulator body rods mounted on plates with copper conductors being clamped thereto, is mechanically quite different from the conductors and increases the scope of shock loading on the pantograph. Although the height of the neutral section insulator can be adjusted relative to the copper conductors in order to align them as closely as possible in the vertical plane, the catenary member that is used for such adjustment makes the neutral section insulator assembly more bulky, increases its structural and mechanical difference from the conductor lines, and complicates its installation. An arcing horn is provided in this neutral section insulator to channel the power dissipation that occurs if the pantograph registers the difference in power supplies. However, it is not particularly effective in this role, as often sparks are seen to form where the pantograph attaches to the neutral section insulator. Furthermore, this neutral section insulator is expensive, wears quickly (it needs to be replaced roughly every eight months), and requires monthly maintenance to turn the insulator body sections (which wear out by virtue of point contact with the pantograph).

Accordingly, it is desirable to provide a neutral section insulator that effectively isolates the conductor lines without posing a "gap" to a pantograph traversing the length of the lines, is maintenance-free during the lifetime of the product, cheap to produce and simple to install.

According to an embodiment of the present invention, there is provided a neutral section insulator for use with an overhead railway conductor line, which neutral section insulator is disposed between the ends of the conductor line when in use and comprises an insulator body to isolate the ends of the conductor line from each other; wherein the neutral axis of the neutral section insulator is such that when the neutral section insulator is in use the neutral axis is aligned closely with the neutral axis of the conductors on its either side and the height of the insulator body is chosen so that the stiffness and the dynamic mass of the neutral section insulator closely match those of the conductors on its either side in both the vertical and horizontal planes.

The structural and mechanical profile of a neutral section insulator embodying the present invention is constructed to closely correspond with that of railway overhead copper conductor lines in order to minimize the scope of being registered by a pantograph, this being achieved by closely aligning the neutral axes (median bending line) of the neutral section insulator and the conductors on its either side, and by closely matching the stiffness and the dynamic mass of the neutral section insulator and the conductors in both the vertical and horizontal planes.

An embodiment of the present invention provides a continuous running surface to the pantograph that is both coplanar with the conductors on its either side (so that the pantograph is not subject to shock loading) and narrow (since misalignment with the pantograph would cause a severe twisting action in the neutral section insulator), and also provides the advantage that the drag imposed by the neutral section insulator on the pantograph is equal to, or less than, that exerted on it by the conductors.

Furthermore, an embodiment of the present invention provides isolation over a distance in excess of 1.5 m, even when the pantograph (which is 0.2 m in width) attaches to the neutral section insulator and effectively increases its length to about 1.7 m.

An embodiment of the present invention is capable of withstanding the 15 kN loads, which are hung every few hundred meters along the length of the conductor lines in order to provide tension, without degrading.

An embodiment of the present invention provides all the above-discussed advantages in adverse environmental conditions such as rain, snow, contamination, etc.

BRIEF DESCRIPTION OF THE SEVERAL VIEW OF THE DRAWINGS

Reference will now be made, by way of example, to the accompanying drawings, in which:

FIG. 2 shows a part of a neutral section insulator embodying the present invention;

FIG. 3 is a more detailed drawing of FIG. 2;

FIG. 6 shows front and side views of the neutral section insulator shown in FIG. 5;

DETAILED DESCRIPTION OF THE PREFERRED EMBODIMENTS

Figure 1:
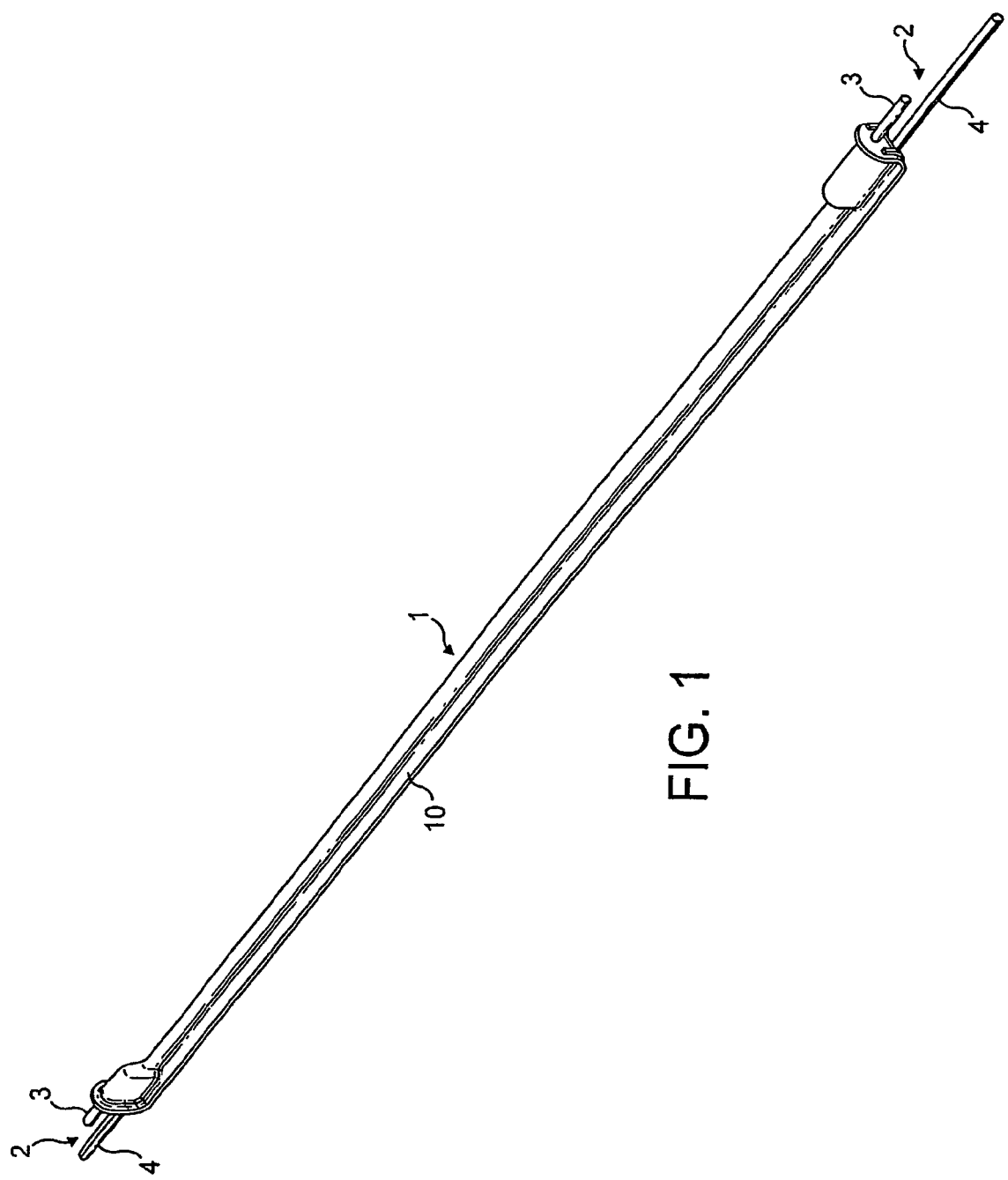
FIG. 1 shows a neutral section insulator embodying the present invention.

FIG. 1 shows a neutral section insulator 1 embodying the present invention. The neutral section insulator 1 includes an elongate insulator body 10 molded from an insulating material such as a glass-fiber reinforced epoxy composite with a 45% glass fraction. The outer surface of the insulator body 10 can be chemically treated or coated with a paint to improve its shedding ability and be generally resilient in adverse environmental conditions, The neutral section insulator 1 also contains a connection member 2 by way of which it connects to adjacent conductor ends. As shown in FIGS. 2 and 3, in one embodiment of the present invention, the connection member 2 is a U-shaped copper member embedded within the insulator body 10 with its legs 3, 4 (hereinafter referred to as conductor tails) protruding therefrom and lying adjacent to the conductors on either side of the insulator body 10. One of the conductor tails 4 is connected to an end of the conductor line using conventional splices, for example, whilst the other conductor tail 3, although usually redundant, can be used as an arcing horn if required. If there is any wear on the conductor section into which the neutral section insulator is being fitted, the end face of the connecting conductor tail 4 can be filed accordingly so that a step height change between the neutral section insulator and the conductor section can be avoided.

Figure 4A:
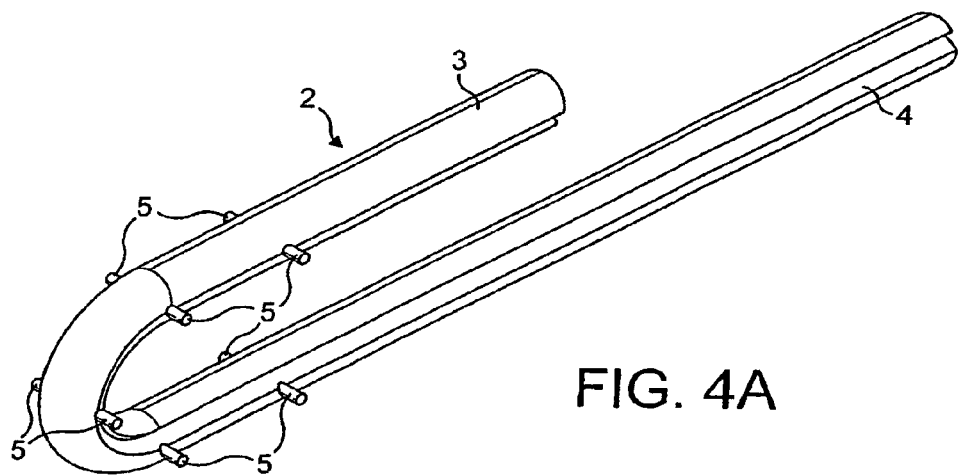
FIG. 4 shows a connection member used in an embodiment of the present invention.
Figure 4B:
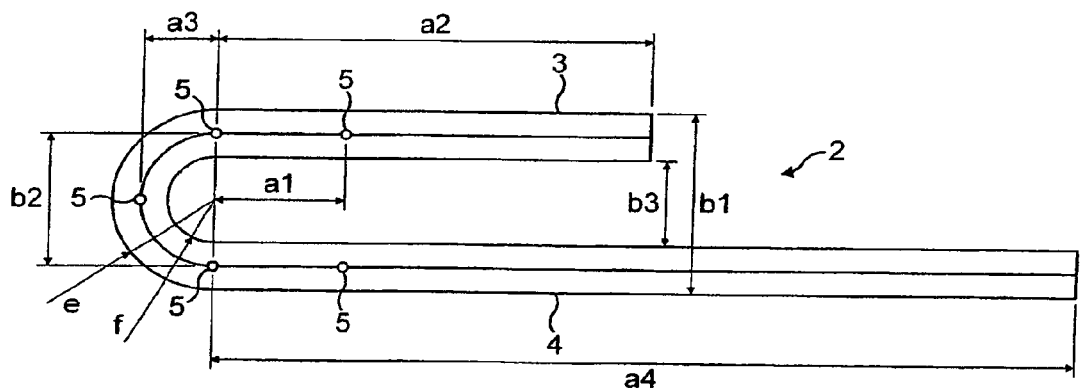
Figure 4C:
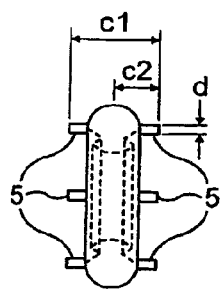

A connection member 2 used in an embodiment of the present invention is shown in more detail in FIG. 4 in which FIG. 4a is a perspective view, FIG. 4b is a front view and FIG. 4c is a side view, As can be seen most clearly from FIG. 4a, pegs 5 are provided on the surface of the connection member 2, equally spaced apart and so as to protrude from the outer surfaces of the conductor tails 3, 4 at corresponding positions. The pegs 5 are driven through the surfaces of the conductor tails 3, 4, before the connection member 2 is placed in the insulator body mold. When the mould sets, the pegs 5 remain firmly lodged in the insulator body walls, thus ensuring that the connection member 2 is held strongly within.

In one embodiment of the present invention, the dimensions indicated in FIG. 4 maybe as follows: a1=30 mm, a2=100 mm, a3=17.09 mm, a4=200 mm, b1=46 mm, b2=34.19 mm, b3=22.37 mm, c1=20 mm, c2=10 mm, and d=2.5 mm. In addition, in such an embodiment, the radii of curvature e and f are 23 mm arid 11.19 mm, respectively.

In an embodiment of the present invention, the elongate insulating body of the neutral section comprises a generally planar contact section extending along the length of the insulating body and having a first height; a spine integrally formed on a top side of the planar contact section, extending along the length of the insulating body, and having a second height; and first and second connection member housings integrally formed with the spine and the planar contact section, and disposed at a respective end of the insulating body. The combination of the first and second heights defines an insulating body height. The profile of the neutral section insulator 1 is matched with those of the copper conductors with which it is to be used on its either side by aligning the neutral axes of the neutral section insulator 1 and the copper conductors. This is achieved by designing the profile of the neutral section insulator 1 such that its neutral axis is as low as reasonably practical, such as, for example, to lie only 12 above the neutral axis of adjacent conductors. Furthermore, the height of the insulator body is increased so that the stiffness of the neutral section insulator 1 matches that of the conductors on its either side in both the vertical and horizontal planes.

Figure 5A:
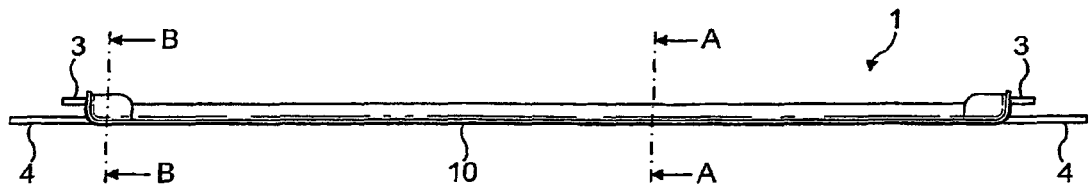
FIG. 5 shows a neutral section insulator embodying the present invention.
Figure 5B:
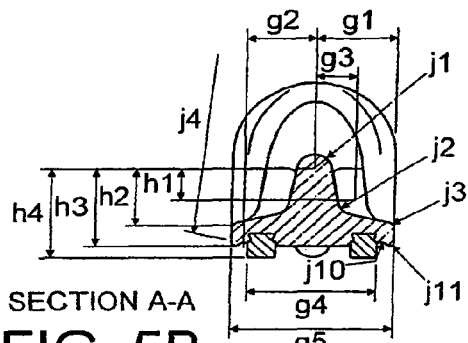
Figure 5C:
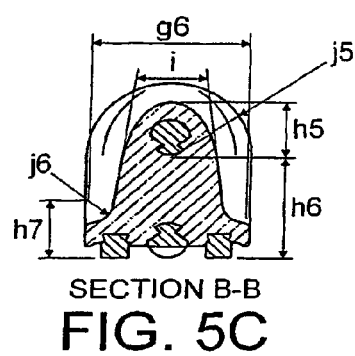
Figure 5D:
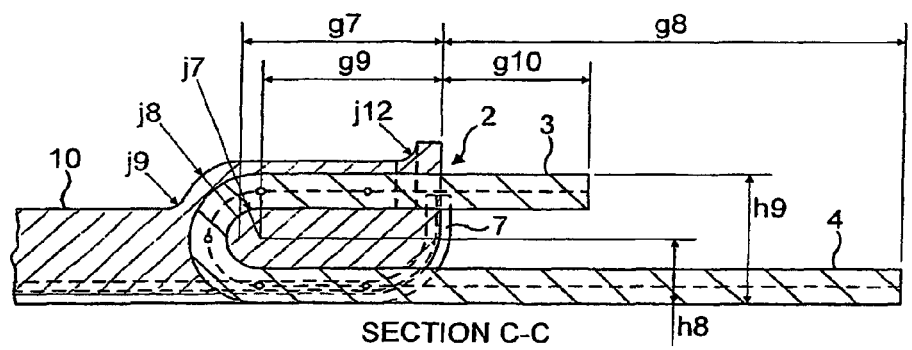
Figure 5E:
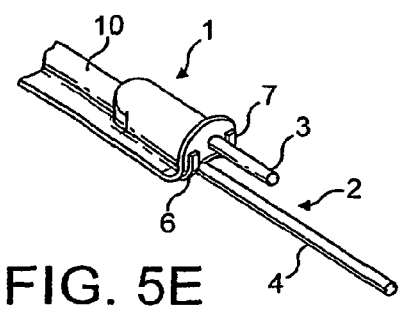
Figure 5F:
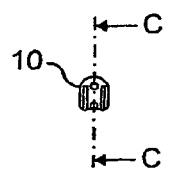

To achieve these criteria, a neutral section insulator 1 embodying the present invention can be designed as shown in FIG. 5, in which FIG. 5a is a front view of the neutral section insulator 1, FIGS. 5b, 5c and 5d are cross-sections respectively taken on line A-A, line B-B, and line C-C, and FIG. 5e shows an outer view of one face of the neutral section insulator 1. As most clearly seen from FIGS. 5b to 5d, when in use, the profile of the neutral section insulator 1 would be streamlined with those of the conductors lying adjacent to it.

In one embodiment of the present invention, the dimensions indicated in FIG. 5 are as follows: g1=24.5 mm, g2=20.71 mm, g3=12 mm, g4=37.6 mm, g5=49 mm, g6=46.52 mm, g7=60 mm, g8=147.59 mm, g9=52.41 mm, 910=47.59 mm, h1=10 mm, h2=19.5 mm, h3=25.93 mm, h4=29 mm, h5=18.05 mm, h6=33 mm, h7=19.24 mm, h8=23 mm, and h9=46 mm. In addition, in such an embodiment, the angle i of the sidewalls of the neutral section insulator 1 is 12°. The radii of curvature in this embodiment are as follows: j1=5 mm, j2=5 mm, j3=1.5 mm, j4=200 mm, j5=24.5 mm, j6=8 mm, j7=11.19 mm, j8=22.06 mm, j9=8 mm, j10=1.5 mm, j11=1.5 mm and j12=8 mm.

Figure 7:
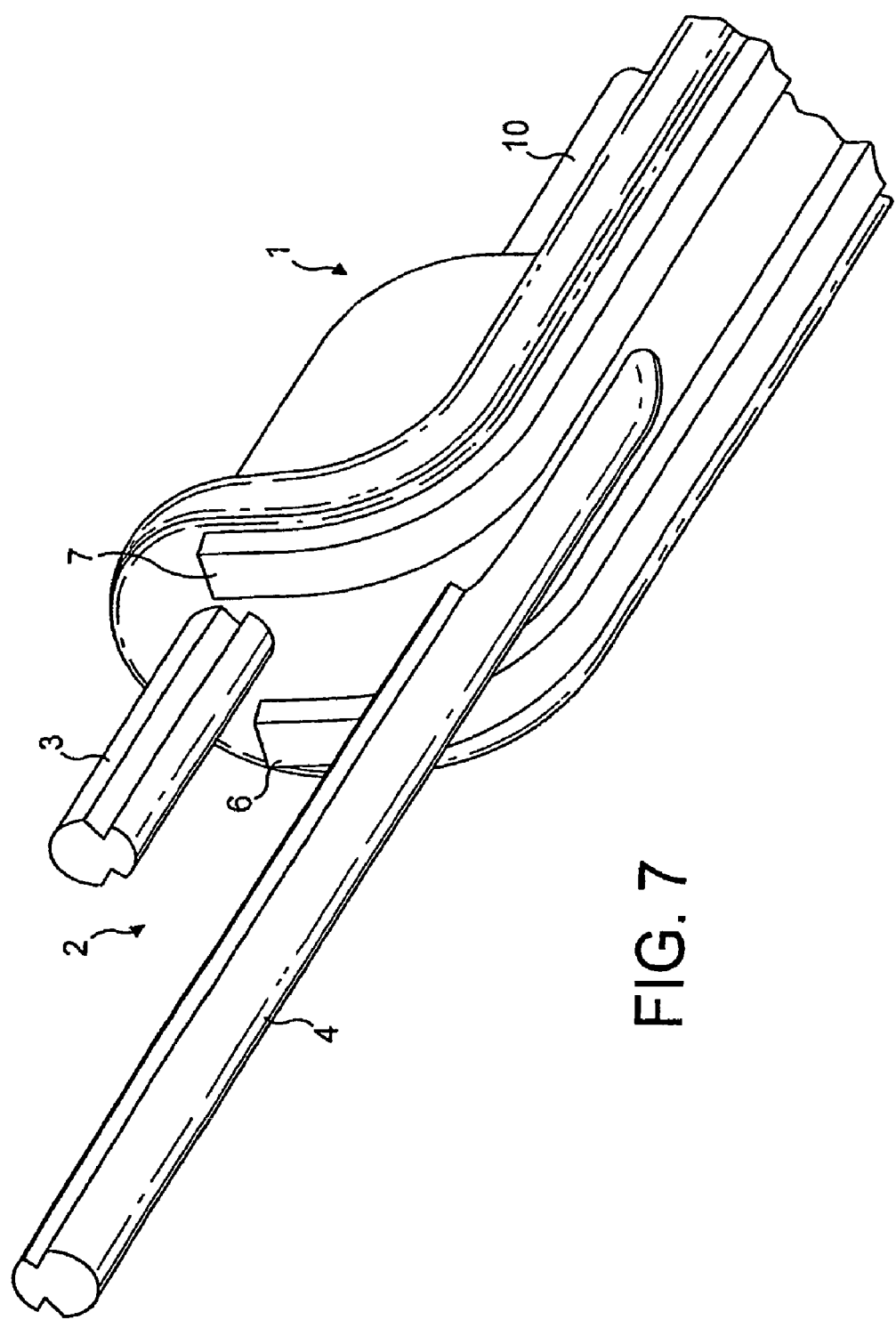
FIG. 7 shows how the PTFE rails are arranged in an embodiment of the present invention.

FIGS. 6a and 6b show respective front and side views of an embodiment of the present invention. As can be seen from FIG. 6a, two rails 6, 7 are embedded in the running surface of the neutral section insulator 1. As these rails 6, 7 lie parallel to the conductor at each end of the neutral section insulator 1, they provide a continuous surface against which the pantograph can run. By virtue of being made of a low friction material, such as PTFE, the rails pose less frictional drag to the pantograph compared to when it traverses the length of the conductors, thus helping to reduce wear of the pantograph and insulator body 10. The wear characteristics of the rails can be improved by incorporating glass beads in the PTFE. As the ends of the neutral section insulator 1 are turned up in a vertical direction, so too are the leading ends of the rails 6, 7, (as can be seen most clearly in FIG. 7) which ensures that the pantograph attaches to the rails 6, 7 without hitting them. Furthermore, by virtue of being guided by the conductor tails 3, 4, onto the rails 6, 7, the pantograph attaches to the neutral section insulator 1 in a fluid and smooth manner.

In one embodiment of the present invention, the dimensions indicated in FIG. 6 are as follows: k1=1706 mm, k2=200 mm, k3=100 mm, k4=21.6 mm, k5=37.6 mm, k6=49 mm, 11=57.5 mm, 12=18.43 mm, and 13=23 mm.

Figure 8:
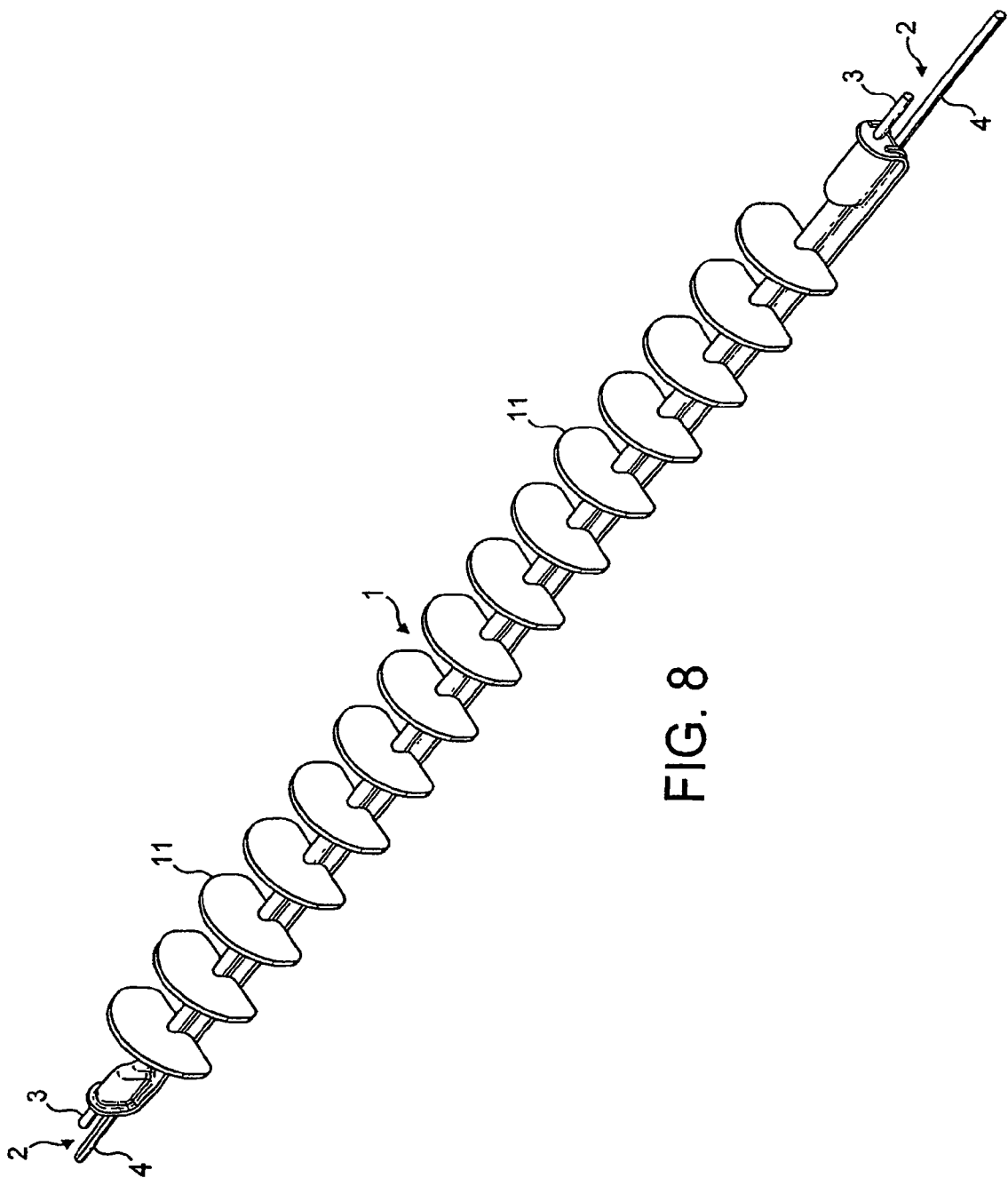
FIG. 8 shows an embodiment of the present invention with a modified surface.

FIG. 8 shows an embodiment of the present invention with a modified surface. Specifically, a semiconductor tape is attached to the spine of the neutral section insulator 1, which has the effect of spreading the excess charge associated with arcing by conducting it along the length of the neutral section insulator 1. Furthermore, electrical plates (barriers) 11 or "sheds" are attached to the spine of the neutral section insulator 1 in order to increase the effective electrical path length of the neutral section insulator 1. In an embodiment of the present invention, the barriers are made from epoxy resin with chopped strand glass fiber reinforcement. However, they could be made of any other appropriate material that is waterproof and non-conducting. It is desirable to make the surface of each barrier as spherical as possible since the presence of any sharp corners would lead to concentration of an electric field, and the undesirable scenario of a corona discharge. As can be seen from FIG. 8, the electrical barriers in an embodiment of the present invention are semi-spherical in shape with slots where they are attached to the spine of the neutral section insulator 1. In an embodiment of the present invention, the barriers are spaced, and not necessarily periodically, at a distance of 100 mm or greater. It has been found that, for the voltages that the neutral section insulator 1 is subjected to when in use, a barrier spacing of less than 100 mm becomes transparent to an electric field, which will "jump" this gap.

It can be understood that, when in use, the neutral section insulator 1 is exposed to different environmental conditions. Specifically, it is undesirable if a condensation film should form on it since salt ions in the film would cause electrical discharge to occur from the outer surface of the neutral section insulator 1. In order to avoid this scenario, a trace heater is incorporated into the molding of the insulator body 10 in an embodiment of the present invention. The function of the trace heater is best understood when the neutral section insulator 1 is subjected to a "salt fog" test. This test involves exposing the neutral section insulator 1 to a salt intensive vapor cloud in a specialized chamber so as to evaluate its discharge properties. The heater is used to increase the temperature of the neutral section insulator 1 above the dewpoint temperature of the condensing vapor cloud so that it does not condense on the outer surface of the neutral section insulator 1, or if it does, it evaporates quickly. Thus, by using a trace heater, it is ensured that no electrical discharge occurs from its surface due to the presence of a condensation film thereon when the neutral section insulator is in use. The trace heater is a printed element on a substrate, for example, a 150 W heater element on a KaptonR strip. Temperature limiting resistors are formed on the printed substrate bearing the heater and are connected in series to the heater. The non-linear dependence of the resistance of these resistors on the ambient temperature drastically limits the current flowing therethrough at high ambient temperatures, thus allowing the temperature of the neutral section insulator 1 to be dynamically regulated and maintained at the same value in extreme environmental conditions. In an embodiment of the present invention, four such temperature limiting resistors are discretely formed along the length of the neutral section insulator 1, at equal intervals, so that the neutral section insulator 1 is maintained at the same temperature along its whole length.

Although a preferred embodiment of the invention has been described, alternative implementations are possible. For example, the connection member 2 need not be U-shaped and can be any other appropriate shape. Also, the connection member 2 can be lodged within the insulator body via alternative means to the pegs 5 described hereinabove. If support is required in the mid-section of a neutral section insulator 1 embodying the present invention, the neutral section insulator 1 may be connected to an overhead catenary system using insulation droppers attached to the spine of the section 1 via adhesive pads.

We claim:

1. A neutral section for use with an overhead railway conductor line, the neutral section isolating a first conductor from a second conductor, the neutral section comprising:
    an elongate insulating body comprising:
        a generally planar contact section extending along the length of the insulating body and having a first height;
        a spine integrally formed on a top side of the planar contact section, the spine extending along the length of the insulating body and having a second height; and
        first and second connection member housings, each connection member housing integrally formed with the spine and the planar contact section and disposed at a respective end of the insulating body;
    wherein the combination of the first and second heights defines an insulating body height,
    wherein the profile of the neutral section is designed such that, when placed in use, the neutral axis of the neutral section is closely aligned with the neutral axes of the first and second conductors connected to respective ends of the insulating body, and
    wherein the insulating body height is chosen such that the stiffness and the dynamic mass of the neutral section, in both the vertical and horizontal planes, substantially match the stiffness and the dynamic mass of the first and second conductors connected to respective ends of the insulating body.

2. The neutral section of claim 1, wherein the insulating body is formed from a glass fiber reinforced epoxy composite.

3. The neutral section of claim 2, wherein the glass fiber reinforced epoxy composite contains a 45% glass fraction.

4. The neutral section of claim 1, further comprising a first connection member disposed in the first connection member housing and a second connection member disposed in the second connection member housing.

5. The neutral section of claim 4, wherein each of the first and second connection members is a U-shaped member with two legs, the two legs protruding outwardly from the respective connection member housing.

6. The neutral section of claim 5, wherein one of the two legs is used for connecting the neutral section to an adjacent conductor line.

7. The neutral section of claim 5, wherein one of the two legs can serve as an arcing horn.

8. The neutral section of claim 4, further comprising one or more pegs extending from the outer surface of each connection member.

9. The neutral section of claim 1, further comprising a running surface member disposed on an underside of the contact section and extending along the length of the contact section, the running surface member providing a continuous running surface between the neutral section and adjacent conductor lines on each end of the neutral section.

10. The neutral section of claim 9, wherein the running surface member is made of a low friction material.

11. The neutral section of claim 9, wherein glass beads are incorporated in the running surface member.

12. The neutral section of claim 9, wherein the running surface member is PTFE.

13. The neutral section of claim 9, comprising two running surface members forming a pair of rails.

14. The neutral section of claim 1, further comprising a semiconductor tape attached to the spine.

15. The neutral section of claim 1, further comprising one or more non-conductive plates attached to the spine.

16. The neutral section of claim 15, wherein each of the non-conductive plates comprises epoxy resin with chopped strand glass fiber reinforcement.

17. The neutral section of claim 15, wherein the plates are spaced at a distance of 100 mm or more.

18. The neutral section of claim 15, wherein the plates have spherical surfaces.

19. The neutral section of claim 1, wherein the ends of the contact section are upturned.

20. The neutral section of claim 1, further comprising a heater incorporated within the insulating body.

21. The neutral section of claim 20, wherein the heating element has a wattage of 150 W.

22. The neutral section of claim 20, further comprising one or more temperature-limiting resistors connected in series with the heater.

* * * * *